United States Patent
Kovitz et al.

(10) Patent No.: US 8,823,494 B1
(45) Date of Patent: Sep. 2, 2014

(54) SYSTEMS AND METHODS FOR WIRELESS DEVICE CONNECTION AND PAIRING

(75) Inventors: Paul Kovitz, Portland, OR (US); Julien Venetz, Geneva (CH); Steve Dusse, Woodside, CA (US); Patricia Perez Guerra, Lausanne (CH); Frantz Lohier, El Cerrito, CA (US)

(73) Assignee: Logitech Europe S.A., Lausanne (CH)

( * ) Notice: Subject to any disclaimer, the term of this patent is extended or adjusted under 35 U.S.C. 154(b) by 491 days.

(21) Appl. No.: 12/950,426

(22) Filed: Nov. 19, 2010

(51) Int. Cl.
*H04Q 5/22* (2006.01)

(52) U.S. Cl.
USPC ........ 340/10.1; 340/10.3; 340/10.4; 340/531; 398/128; 726/2

(58) Field of Classification Search
CPC ............ G06K 7/0008; G06K 19/0723; G06K 19/07749; G06K 2017/0045; G06K 7/10039; G06K 7/10049; G06K 17/0022; G07C 9/00111; G08B 13/2462; G08B 25/10; G08B 25/08; G08B 1/08; G08B 25/009; G06Q 10/087; A61B 5/0002
USPC ............ 340/10.1, 10.2, 10.3, 5.74, 10.4, 531; 398/128; 702/158; 726/2
See application file for complete search history.

(56) References Cited

U.S. PATENT DOCUMENTS

| | | | |
|---|---|---|---|
| 6,295,002 B1 * | 9/2001 | Fukuda | 340/636.1 |
| 6,783,071 B2 | 8/2004 | Levine et al. | |
| 7,356,565 B2 | 4/2008 | Zimmermann et al. | |
| 7,458,075 B2 | 11/2008 | Keys | |
| 8,296,472 B2 | 10/2012 | Cota-Robles et al. | |
| 8,640,216 B2 | 1/2014 | Anderson et al. | |
| 2003/0208543 A1 | 11/2003 | Enete et al. | |
| 2003/0220765 A1 * | 11/2003 | Overy et al. | 702/158 |
| 2004/0253923 A1 | 12/2004 | Braley et al. | |
| 2005/0071427 A1 | 3/2005 | Dorner et al. | |
| 2005/0088997 A1 * | 4/2005 | Melpignano | 370/338 |
| 2005/0198131 A1 | 9/2005 | Appelman et al. | |

(Continued)

FOREIGN PATENT DOCUMENTS

| | | |
|---|---|---|
| CN | 1450763 | 10/2003 |
| CN | 1801787 | 7/2006 |

(Continued)

OTHER PUBLICATIONS

Office Action Received for Chinese Patent Application No. 200810084374.0, mailed on Sep. 14, 2010, 8 pages of Office Action and 7 pages of English Translation.

(Continued)

*Primary Examiner* — Omer S Khan
(74) *Attorney, Agent, or Firm* — Kilpatrick Townsend & Stockton LLP

(57) ABSTRACT

Systems and methods for wireless device connection and pairing are provided. Embodiments relate to automatic device connection or pairing by accessing or acquiring a machine-readable feature. Machine-readable features may include printed or displayed machine-readable indicia, such as linear (e.g., one-dimensional) barcodes, matrix (e.g., two-dimensional) barcodes, quick response (QR) codes, characters, symbols, labels, pictorial icons, graphics, images, watermarks, holograms, or any other printed or displayed indicia that may be used to encode, represent, or lookup information. Machine-readable features may also include non-printed features, such as magnetic strips, radio frequency identification (RFID) tags, various other types of sensors and tags embedded or attached to electronic devices, and audio and visual signals.

28 Claims, 9 Drawing Sheets

(56) References Cited

U.S. PATENT DOCUMENTS

| | | |
|---|---|---|
| 2005/0211784 A1 | 9/2005 | Justin |
| 2005/0228876 A1 | 10/2005 | Malik |
| 2006/0101119 A1 | 5/2006 | Qureshi et al. |
| 2006/0135064 A1 | 6/2006 | Cho et al. |
| 2006/0176378 A1 | 8/2006 | Okamoto |
| 2006/0232437 A1* | 10/2006 | Gutowski et al. ........ 340/825.69 |
| 2006/0265454 A1 | 11/2006 | Forlenza et al. |
| 2007/0071416 A1 | 3/2007 | Ikemizu |
| 2007/0263075 A1 | 11/2007 | Nimri et al. |
| 2008/0034040 A1 | 2/2008 | Wherry et al. |
| 2008/0055048 A1* | 3/2008 | Bonneau et al. ............. 340/10.4 |
| 2008/0072285 A1* | 3/2008 | Sankaran et al. .................. 726/2 |
| 2008/0134295 A1 | 6/2008 | Bailey et al. |
| 2008/0134343 A1 | 6/2008 | Pennington et al. |
| 2008/0231716 A1 | 9/2008 | Anderson |
| 2009/0031381 A1 | 1/2009 | Cohen et al. |
| 2009/0067846 A1* | 3/2009 | Yu et al. ........................ 398/128 |
| 2010/0012715 A1 | 1/2010 | Williams et al. |
| 2014/0043485 A1 | 2/2014 | Bateman et al. |
| 2014/0043493 A1 | 2/2014 | Bateman et al. |
| 2014/0043495 A1 | 2/2014 | Bateman et al. |
| 2014/0047143 A1 | 2/2014 | Bateman et al. |

FOREIGN PATENT DOCUMENTS

| | | |
|---|---|---|
| CN | 101277274 | 10/2008 |
| DE | 69916277 | 3/2005 |
| DE | 602004008731 | 6/2008 |
| DE | 602004009020 | 6/2008 |
| DE | 102008007085 | 8/2009 |

OTHER PUBLICATIONS

Vainio "Bluetooth Security" May 25, 2000; 15 pages.

Office Action issued on Sep. 5, 2013 in German Application No. 102011086678.7.

USB/IP Project, USB Request over IP Network, http://usbip.sourceforge.net/ , Feb. 23, 2011.

USB/IP—a Peripheral Bus Extension for Device Sharing over IP Network. Takahiro Hirofuchi, Eiji Kawai, Kazutoshi Fujikawa, and Hideki Sunahara. In the Proceedings of the FREENIX Track: USENIX Annual Technical Conference, pp. 47-60, Apr. 2005.

USB/IP: A Transparent Device Sharing Technology over IP Network. Takahiro Hirofuchi, Eiji Kawai, Kazutoshi Fujikawa, and Hideki Sunahara. IPSJ Transactions on Advanced Computing Systems, vol. 46, No. SIG11(ACS11), pp. 349-361, Aug. 2005.

U.S. Appl. No. 61/681,981, filed Aug. 10, 2012.
U.S. Appl. No. 61/713,429, filed Oct. 12, 2012.
U.S. Appl. No. 61/713,440, filed Oct. 12, 2012.
U.S. Appl. No. 61/792,082, filed Mar. 15, 2013.
Non-Final Office Action mailed May 24, 2013 in U.S. Appl. No. 12/950,426.
Non-Final Office Action mailed Feb. 20, 2014 in U.S. Appl. No. 13/960,202.

* cited by examiner

SYSTEMS AND METHODS FOR WIRELESS DEVICE CONNECTION AND PAIRING

BACKGROUND OF THE INVENTION

Embodiments of the present invention generally relate to connection or pairing of wireless devices. More particularly, embodiments of the present invention relate to facilitated connection or pairing of wireless devices using machine-readable features, such as visual and audio signals.

Many electronic devices today have wireless interfaces that support wireless network communications. For example, a wireless personal area network (WPAN) is a type of personal area network (PAN) for interconnecting wireless devices centered around, for example, an individual's personal workspace. Typically, a WPAN uses some technology that permits communication within approximately 10 meters (or some other short range). One such technology that has gained widespread popularity is Bluetooth, which was used as the basis for a new standard called IEEE 802.15. Other such technologies include, for example, infrared data association (IrDA), ultra-wideband (UWB), Z-Wave®, ZigBee®, ANT™, and Bluetooth Low Energy (also known as Bluetooth 4.0).

Bluetooth is one standard for wireless communication between devices with a wireless interface, such as between a personal computer and a mobile telephone, over short distances and at low power. Bluetooth allows voice and data communications between various digital devices without a physical cable, using frequency-hopping spread spectrum technology in a radio frequency (RF) band of 2.45 GHz that may not require a license for wireless communication. For example, Bluetooth wireless technology built into a mobile telephone and a laptop computer may be used to replace one or more cables used to interconnect the mobile telephone, the laptop computer, and various peripherals and accessories of the mobile telephone and laptop computer. Various other electronic devices, including Personal Digital Assistants (PDA), hands-free headsets, car speakerphone/audio systems, digital cameras, desktop computers, facsimile machines, printers, scanners, global positioning system (GPS) receivers, copiers, keyboards, mice, and video game consoles, may also be included in a Bluetooth network.

A user terminal supporting the Bluetooth standard may establish a wireless connection with neighboring Bluetooth devices using point-to-point connections. A master-slave structure may be used with one master device communicating with up to seven slave devices in a network group called a piconet. All slave devices may share the master device's clock. Packet exchange is based on the piconet basic clock, defined by the master, which ticks at 312.5 μs intervals. During the pairing process, the slave devices adapt their native clocks with a timing offset in order to match their native clocks to the piconet basic clock (i.e., the master's clock). In the simple case of single-slot packets, the master device transmits in even slots and receives in odd slots; the slave devices, conversely, receive in even slots and transmit in odd slots. Packets may be one, three, or five slots long, and the master device may begin each transmission in an even slot, while the slave devices may begin each transmission in an odd slot. Devices may switch roles, by agreement, and a slave device may become a master device at any time. Simultaneous transmission from the master device to multiple slave devices is possible via a broadcast mode.

Many of the services offered over Bluetooth can expose private data or allow the connecting party to control the Bluetooth device. For security reasons, it is sometimes desirable to control the devices that are allowed to connect to a given Bluetooth device. At the same time, it is useful for Bluetooth devices to automatically establish a connection without user intervention as soon as they are in range. To resolve this conflict, Bluetooth uses a process called pairing. Pairing may be used to establish wireless connection parameters between two devices. Pairing is generally initiated using a discovery process that makes the device's Bluetooth link visible to other devices. The pairing process is typically triggered automatically the first time a device receives a connection request from a device with which it is not yet paired. After a pairing has been established, parameters associated with the pairing may be remembered (e.g., stored) by the devices, which can then reconnect to each other without user intervention. If desired, the pairing relationship can later be removed by the user.

To facilitate pairing, each Bluetooth device is associated with a unique 48-bit address known as the Bluetooth Device Address or BD_ADDR. The device-specific BD_ADDR may be used to seed algorithms required to implement the core Bluetooth functionality. For example, the BD_ADDR is used during physical connection establishment (e.g., the paging procedure) and device discovery (e.g., the inquiry procedure). The BD_ADDR is also used by the Bluetooth communication protocol stack to maintain link layer security.

In order to successfully pair two Bluetooth devices, a user of a first Bluetooth device must typically manually select a desired second Bluetooth device to pair with from a menu or list of available Bluetooth devices in range of the first Bluetooth device. In order to generate the menu or list of available Bluetooth devices, the Bluetooth inquiry and paging procedures are executed. These procedures may be quite lengthy requiring several seconds to complete. Discovered Bluetooth devices are generally displayed in the menu or list alphabetically by BD_ADDR (or a device-friendly name, such as manufacturer/model number, or other unique identifier). After Bluetooth devices have been paired a first time, the Bluetooth devices may remember (e.g., store) information relating to the pairing (e.g., the Bluetooth address, one or more link keys, PIN values, etc.) and be configured to connect automatically in the future whenever the Bluetooth devices are in range. When Bluetooth devices share information relating to a pairing (e.g., link keys), the Bluetooth devices are sometimes said to be "bonded."

Similarly, in order to connect a device to an access point (AP) in a wireless local area network (WLAN), such as an 802.11 network, a unique identifier or address is typically required. For example, every basic service set (BSS) has an identification called the BSSID, which is typically representative of the MAC address of the AP servicing the BSS. In order to connect to another device in the BSS, a device must first connect to the AP using the BSSID of the AP. For example, a user of a device must generally select the desired BSSID corresponding to the desired AP from a list or menu. After a device has connected to an AP a first time, the device may remember (e.g., store) information relating to the connection (e.g., the BSSID of the AP, security settings, AP passkeys, etc.) and be configured to connect automatically in the future whenever the devices are in range. Some WLAN devices (e.g., Blackberry® devices) may also support an automatic WLAN setup mode where a physical button (e.g., a Wi-Fi Protected Setup button) may be pressed on an AP or wireless router. In the automatic WLAN setup mode, network address and encryption information may be automatically transferred to the WLAN device and stored on the WLAN device in a profile.

In some cases, manual intervention may be required to pair Bluetooth devices or connect to an AP, particularly when connecting for the first time. In addition, it is often not clear to a user of a first Bluetooth device which Bluetooth devices or APs are identified in the menu or list of devices or APs in range of the first Bluetooth device. For example, as described above, Bluetooth devices are usually identified by Bluetooth address and APs are usually identified by BSSID or MAC address. Often times, a user is uncertain what devices or APs the first Bluetooth device is connecting to, or pairing with, because of, for example, unfamiliarity with the Bluetooth address, BSSID, or MAC address of the devices or APs in range of the first Bluetooth device.

Thus there is need for a system and method for easier and more intuitive and/or automatic pairing/connection between devices. There is also a need for a system and method for such pairing/connection to occur with minimal or no user intervention.

BRIEF SUMMARY OF THE INVENTION

In view of the foregoing, systems and methods for facilitated device connection and pairing are provided. Embodiments of the present invention generally relate to automatic device connection or pairing by accessing or acquiring a machine-readable feature. The machine-readable feature may be displayed by the device, emitted by the device, or attached or affixed to the device. Machine-readable features may include printed or displayed machine-readable indicia, such as linear (e.g., one-dimensional) barcodes, matrix (e.g., two-dimensional) barcodes, quick response (QR) codes, characters, symbols, labels, pictorial icons, graphics, images, watermarks, holograms, or any other printed or displayed indicia that may be used to encode, represent, or lookup information. Machine-readable features may also include non-printed features, such as magnetic strips, radio frequency identification (RFID) tags, and various other types of sensors and tags embedded or attached to electronic devices (e.g., electronic computing devices, such as PDAs, mobile telephones, laptop computers, printers, scanners, and gaming consoles, various input devices, various output devices, and wireless APs). Machine-readable features may also include electromagnetic radiation (e.g., an IR, UV, or visible light signal). For example, a particular pattern, pulsing scheme, or wavelength may be emitted from a light source (e.g., an LED integrated with or attached to a device). Such electromagnetic radiation may include visible light and other forms of electromagnetic radiation (e.g., IR or UV radiation). Machine-readable features may also include audio signals. For example, a series of encoded or modulated audio tones may be output from a speaker or other audio output device integrated with or attached to a device. In some embodiments, the audio signals and tones may include signals and tones of a frequency outside the human hearing range of approximately 20 Hz to 20 kHz.

To facilitate connection or pairing, a first device may optically acquire or capture the printed or displayed machine-readable feature (or otherwise read, sense, detect, or process a non-printed or non-displayed feature) in order to initiate an automatic connection or pairing process with one or more other devices. For example, a scanner or camera associated with a laptop computer may optically acquire a barcode in order to initiate automatic Bluetooth pairing between the laptop computer and any number of other Bluetooth devices, such as peripherals.

In some embodiments, a machine-readable feature is acquired by a first device. The machine-readable feature is automatically decoded by the first device and used to access connection parameters relating to one or more other devices. If a security mode is defined that requires an access code input (e.g., a personal identification number (PIN), password, etc.), then access code information may be exchanged. Link keys may then be exchanged, and the connection may be completed using the exchanged link keys. The accessed connection parameters may then be stored to one or more of the first device and the one or more other devices to facilitate future connections.

In some embodiments, the machine-readable feature may take the form of electromagnetic radiation, such as visible light or a non-visible electromagnetic radiation signal (e.g., an IR or UV signal). The signal may be emitted by a first device (e.g., a device with a display, LED, LED array, or other visible light or non-visible electromagnetic radiation output). The signal may be of a particular pattern, duration, color, wavelength, or intensity. A sensor (e.g., optical sensor) at a second device may receive, sense, or detected the signal and decode the signal based, at least in part, on one or more of the detected pattern, duration, color, wavelength, or intensity. The detected signal may then be converted into a digital representation and used to access connection or pairing parameters.

In some embodiments, a connection request is initiated by a first device. An audio signal is received by a second device, and the audio signal may be decoded by the second device. In response to decoding the audio signal, connection parameters relating to one or more other devices may be accessed. In some embodiments, the audio signal may include an audio signal of a frequency outside the human hearing range of approximately 20 Hz to 20 kHz. An automatic connection process may then be initiated between the first device and the one or more other devices. If a security mode is defined that requires an access code input (e.g., a personal identification number (PIN), password, etc.), then access code information may be exchanged. Link keys may then be exchanged, and the connection may be completed using the exchanged link keys. The accessed connection parameters may then be stored to one or more of the first device and the one or more other devices to facilitate future connections.

In some embodiments, the machine-readable feature is decoded to produce connection parameters relating to one or more other devices. For example, the connection parameters may include address information (e.g., Bluetooth addresses, MAC addresses, BSSIDs, etc.), security information (e.g., PIN values, link keys, encryption keys, signed certificates, hash values, etc.), as well as other optional application information, such as supported applications, required applications, and a list of applications to be executed automatically after the connection or pairing process has completed.

In some embodiments, connection parameters may also include system time or clock information, such as a clock estimate value used to decrease connection setup time. The clock estimate value may be used to generate timing offset values used to synchronize a device with the system clock (e.g., the master's clock). By providing a clock estimate, delays associated with connection setup may be reduced.

In some embodiments, a computer-readable medium contains computer-readable instructions recorded thereon that, when executed by a processor, cause a device to initiate an automatic connection or pairing process. The process may include decoding a machine-readable feature associated with a device, determining connection parameters based at least in part on the decoding, exchanging link keys used in the connection, and storing at least some of the connection parameters to the device for use, for example, in subsequent connections.

In some embodiments, the machine-readable feature is decoded to produce a unique identifier. This unique identifier may then be used to lookup connection parameters relating to at least one other device. For example, the unique identifier may correspond to a unique key of a table in a relational database stored on the device, stored on one of the at least one other device, stored on a third-party storage device, or stored on a network device (e.g., a storage device accessible via the Internet or an Intranet, a remote server, etc.). A first part of a digital representation of the machine-readable feature may be used as the database key, and a second part of the digital representation of the machine-readable feature may be used as the network address from which the database may be accessed. After accessing the connection parameters from a remote storage location, at least some of the parameters may be cached for use in subsequent connections.

In some embodiments, a device may automatically connect to one or more other devices using a negotiated protocol. The protocol negotiation may be based on a power requirements analysis for the device, the one or more other devices, or both. For example, some devices may support more than one wireless protocol (e.g., 802.11 and Bluetooth). Depending on the anticipated mobility of the devices, the anticipated applications to be used on the devices, and a power requirements analysis, the most appropriate protocol may be negotiated automatically. In some embodiments, the protocol with the lowest transmit power or range is selected for use unless that protocol is not suitable for the anticipated usage of the devices. In some embodiments, the protocol with the strongest security policy (e.g., encryption or authentication) is selected for use unless that protocol is not suitable for the anticipated usage of the devices. In some embodiments, the protocol with the lowest transmit power or range and the strongest security policy (e.g., encryption or authentication) is selected for use unless that protocol is not suitable for the anticipated usage of the devices. In some embodiments, a user is able to specify and/or select specific preferred protocols, and or parameters for selection of such preferred protocols.

BRIEF DESCRIPTION OF THE DRAWINGS

In the appended figures, similar components and/or features may have the same reference label.

DETAILED DESCRIPTION OF THE INVENTION

Embodiments of the present invention generally provide systems and methods for facilitated or automatic device connection or pairing using machine-readable features, such as machine-readable indicia and audio signals. A first device may acquire a machine-readable feature in order to initiate an automatic device connection or pairing process with a second device (or with a plurality of devices). The device connection or pairing process may be "automatic" in that no additional user intervention or user input may be required to complete the device connection or pairing process. For example, a scanner or camera associated with a laptop computer may optically acquire a barcode in order to initiate automatic Bluetooth pairing between the laptop computer and any number of other Bluetooth devices, such as peripherals. Although Bluetooth device and Bluetooth pairing are sometimes used herein as examples, the described embodiments are in no way limited to Bluetooth devices or Bluetooth pairing, and other types of device and protocols may also be used.

If more than one network protocol is supported between the first device and the second device, one or more of a power requirements analysis and a usage requirements analysis may be performed. One network protocol of the more than one supported network protocols may be selected for use in establishing a connection between the first device and the second device based, at least in part, on the power requirements analysis, the usage requirements analysis, or both the power requirements analysis and the usage requirements analysis. After the first device and the second device have connected or paired a first time, connection parameters may be stored to one or both devices.

Figure 1:
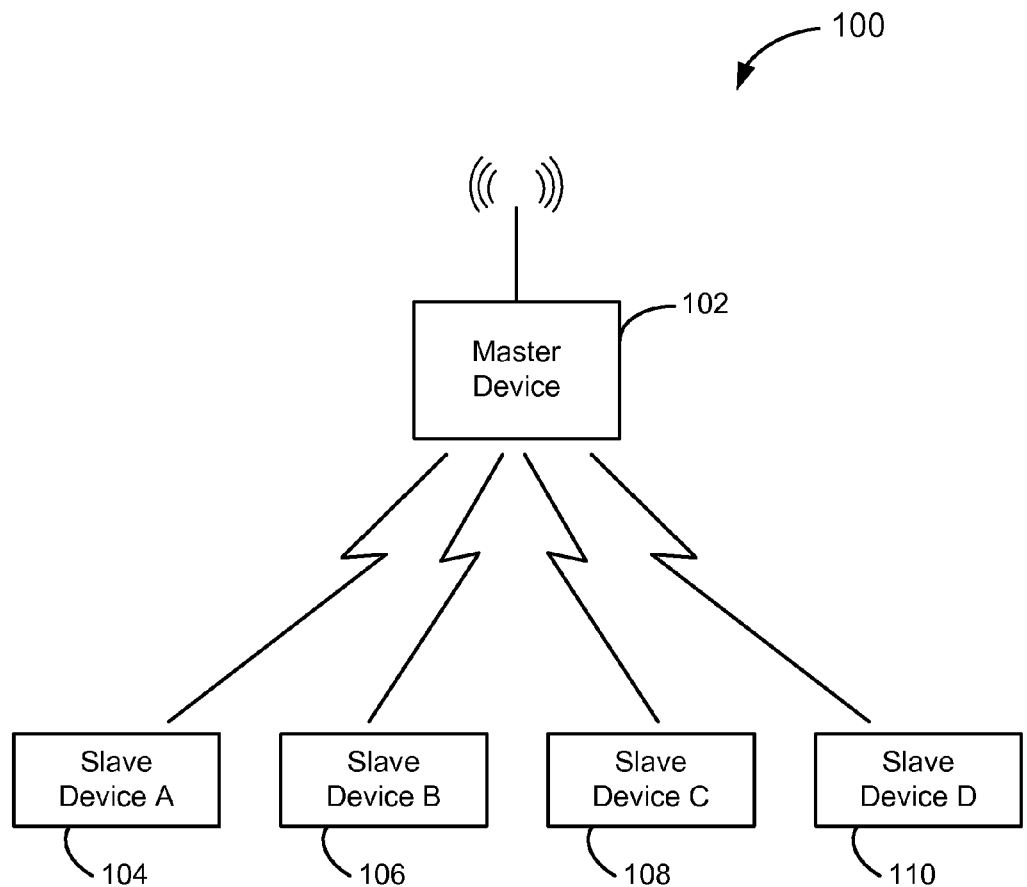
FIG. 1 is an illustrative network topology according to one embodiment of the present invention.

FIG. 1 is simplified schematic of a network 100 according to one embodiment of the present invention. Network 100 may include any wireless network associated with a WLAN, PAN, or any other wireless network. For example, network 100 may be a Bluetooth wireless network. A user terminal or device supporting the Bluetooth standard may establish a wireless connection with neighboring Bluetooth devices using point-to-point connections. A master-slave arrangement may be used with one master device communicating with up to seven slave devices, for example, in a network group called a piconet.

According to one embodiment, network 100 includes a device 102, which may be the master device, and devices 104, 106, 108, and 110, which may be slave devices in the same piconet as device 102. Device 102 may establish a wireless connection with neighboring devices 104 through 110 by executing an inquiry procedure and a paging procedure. After the inquiry procedure and paging procedure, a user of device 102 may select each of devices 104 through 110 from a menu or list of devices that are in range. Alternatively, an automatic procedure may be initiated by acquiring a machine-readable feature with device 102. In some embodiments, each of devices 102, 104, 106, 108, and 110 may be Bluetooth devices. The machine-readable feature acquired by device 102 may be used to access connection parameters (e.g., network address information) about one or more of devices 104 through 110. The connection parameters may include information required to establish connections with devices 104 through 110. For example, depending on the protocol used, a network address (e.g., Bluetooth address) for each of devices 104 through 110 may be used to establish connections to devices 104 through 110. Other connection parameters, such as authentication and other security information, may also be included in the connection parameters that are accessed via the machine-readable feature.

For example, Bluetooth includes several security features. Bluetooth implements confidentiality, authentication, and key derivation using custom algorithms based on the SAFER+ block cipher. Bluetooth key generation is generally based on a Bluetooth PIN, which must be input into both devices. This procedure might be modified if one of the devices has a fixed PIN (e.g., for headsets or similar devices with a restricted user interfaces). During device connection, an initialization key or a master key is generated, using the E22 key generation algorithm. The E0 stream cipher is used for encrypting packets and is based on a shared cryptographic secret, namely a previously generated link key or master key. Those keys, used for subsequent encryption of data sent via the wireless interface, rely on the Bluetooth PIN, which has been input into one or both devices. The connection parameters accessed via the machine-readable feature acquired by device 102 may include any such PIN values, link keys, and/or master keys.

Each wireless connection between device 102 and devices 104 through 110 may include a point-to-point bi-directional or uni-directional link. The wireless connections may be connection-oriented or connectionless. Various error-detection, error-correction, and wireless medium access control (MAC) schemes (e.g., CSMA/CD) may be used. Although device 102 is wirelessly connecting to only four devices 104 through 110 in the example of FIG. 1, device 102 may wirelessly connect to more or fewer devices in network 100 in other embodiments. In addition, the protocols used by device 102 to wirelessly connect to devices 104 through 110 may be the same or different protocols (some of which may be wired protocols). For example, the 802.11 protocol may be used by device 102 to wirelessly connect to devices 104 and 110 whereas the Bluetooth protocol may be used to wirelessly connect to devices 106 and 108. Some devices in network 100 may support more than one protocol (e.g., 802.11 and Bluetooth).

In some embodiments, device 102 automatically connects to one or more of devices 106 through 110 using a negotiated protocol. As described in more detail with regard to FIG. 7 below, the protocol negotiation may be based on one or more of an anticipated power requirements analysis for the devices, an anticipated usage requirements analysis for the devices, and anticipated or mandated security requirements. For example, some devices may support more than one wireless protocol (e.g., 802.11 and Bluetooth). Depending on the anticipated mobility of the devices, the anticipated applications to be used on the devices, and a power requirements analysis, the most appropriate protocol may be negotiated automatically. In some embodiments, the protocol with the lowest transmit power or range is selected for use unless that protocol is not suitable for the anticipated usage of the devices. In some embodiments, the protocol with the strongest security policy (e.g., encryption or authentication) is selected for use unless that protocol is not suitable for the anticipated usage of the devices. In some embodiments, the protocol with the lowest transmit power or range and the strongest security policy (e.g., encryption or authentication) is selected for use unless that protocol is not suitable for the anticipated usage of the devices.

Figure 2:
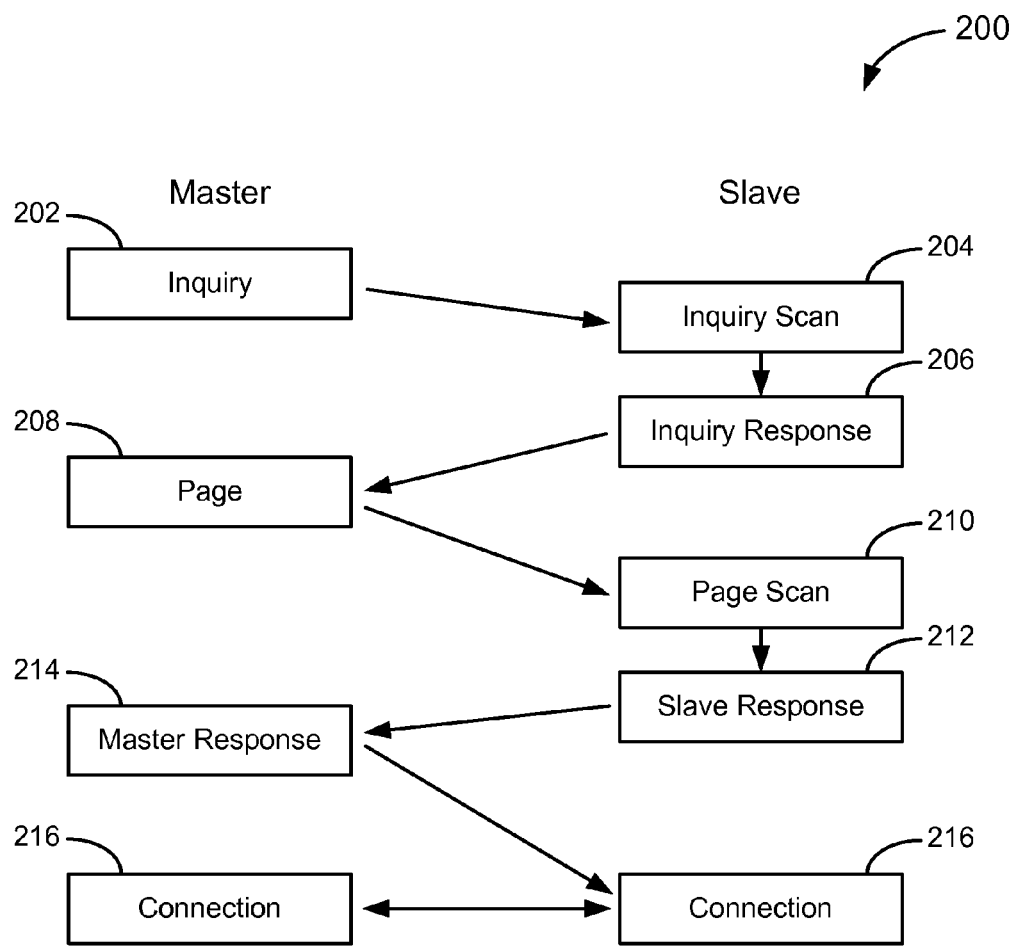
FIG. 2 is an illustrative connection sequence according to one embodiment of the present invention.

FIG. 2 shows an illustrative connection sequence 200 between a first device and one or more other devices according to a typical pairing process. Connection sequence 200 may be used to determine which devices are in range of a device initiating connection sequence 200 and to connect to one or more of these other devices. Normally, a wireless connection (e.g., a Bluetooth connection) between two devices is initiated with an inquiry procedure 202. Inquiry procedure 202 enables the first device to discover other devices that are in range. Inquiry procedure 202 may also determine the addresses and clocks for the other devices that are in range of the first device. During inquiry procedure 202, the first device may transmit inquiry packets and receive inquiry replies. The other devices that receive the inquiry packets may be in an inquiry scan state 204 to receive the inquiry packets transmitted by the first device. The other devices may then enter an inquiry response state 206 and transmit an inquiry reply to the first device. After the inquiry procedure is completed, a connection may be established using a paging procedure 208. Paging procedure 208 typically follows inquiry procedure 202. Although the device address (e.g., Bluetooth address) may be required to establish a connection, some knowledge about the master device's clock (e.g., a clock estimate) may accelerate the setup procedure.

Paging procedure 208 may begin with the first device paging one or more other devices (e.g., slave devices) that are in a page scan state 210. The slave device may transmit a reply to the page to the first device during a slave response state 212. During a master response state 214, the first device may transmit a frequency hopping synchronization (FHS) packet to the other devices. The FHS packet may include the first device's address and clock information. The other devices then send a second reply to the first device in slave response state 212. The first device and the other devices then switch to the first device's channel parameters (e.g., timing and channel frequency hopping sequence) during master response state 214. A connection state 216 starts with a packet with no payload (e.g., a Bluetooth POLL packet) sent by the first device to verify that other devices have switched to the first device's timing and channel frequency hopping sequence. The other devices may respond with any type of packet.

As shown in the example of FIG. 2, a relatively lengthy inquiry procedure and paging procedure are typically used when connecting to devices for the first time. If some connection parameters are known (e.g., a network address), then the inquiry procedure may be bypassed and the paging procedure may be immediately initiated to establish the connection. During the paging procedure, the other device may adapt its native clock to match the first device's clock using a timing offset. In some embodiments, to transmit over the network, at least the channel hopping sequence, the phase of the sequence, and the channel access code may be used.

Figure 3:
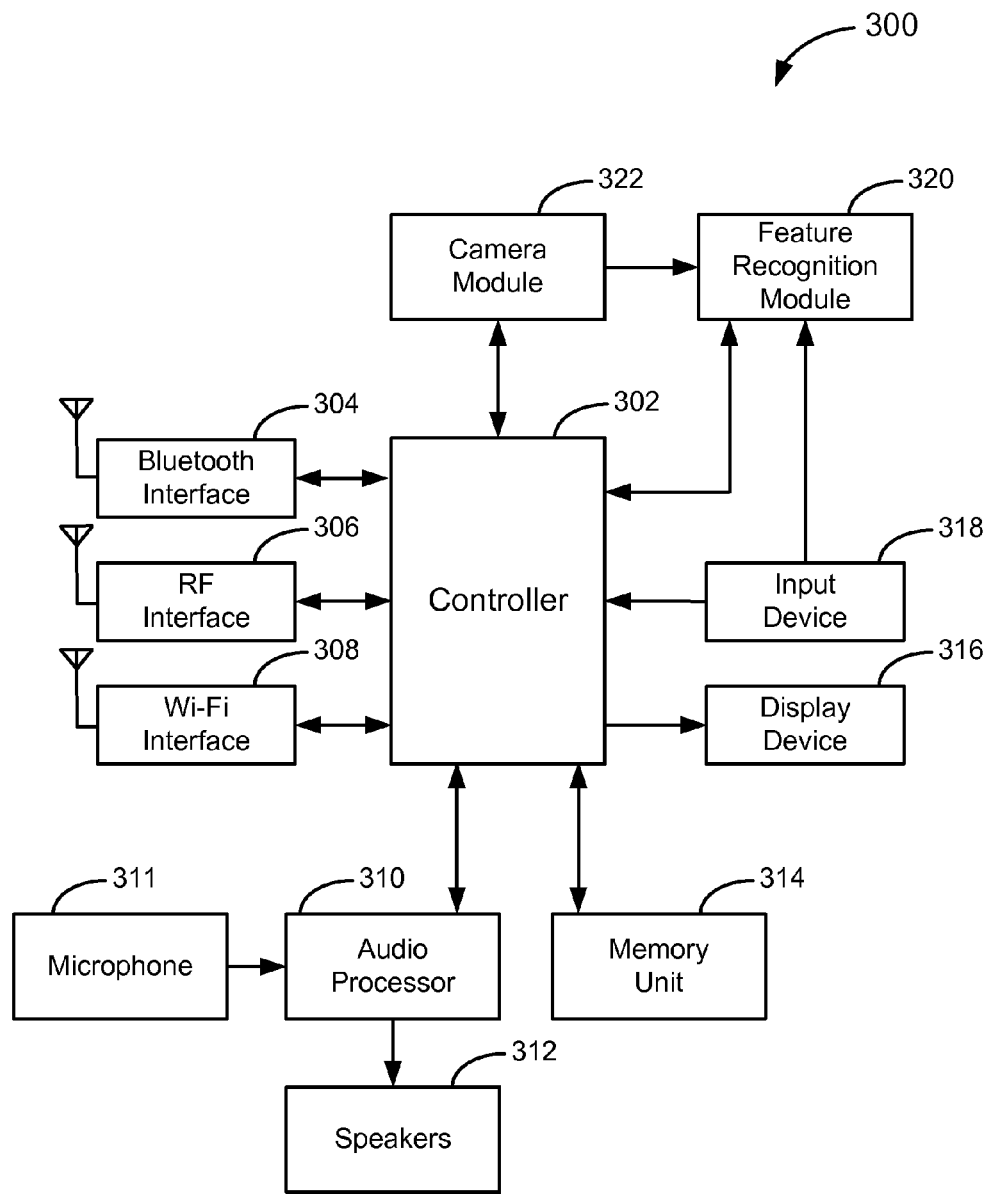
FIG. 3 is a illustrative block diagram of a user device according to one embodiment of the present invention.

FIG. 3 is a block diagram of a device 300 according to one embodiment of the present invention. Device 300 may be any electronic device with a wireless interface, such as a mobile telephone, a tablet, a PDA, or laptop computer, and may be configured to acquire a machine-readable feature and automatically connect to, or pair with, one or more other wireless devices. For example, device 300 may take the form of a mobile telephone capable of pairing with an automobile audio or speakerphone system. Device 300 includes a controller 302 that controls the overall operation of device 300. Controller 302 may include one or more processors (e.g., microprocessors) configured to execute machine-readable instructions. A memory unit 314 (e.g., RAM, ROM, hybrid types of memory, storage device, hard drives, optical disc drives, etc.) may store a predetermined program or application for controlling the overall operation of device 300 and store data input and output in memory unit 314.

A camera module 322 may convert an image or a moving picture to a digital form, and controller 302 may store the digital form in memory unit 314. A feature recognition module 320 may be configured to read, detect, or sense a machine-readable feature (e.g., a printed or displayed indicia, visible light, or non-visible electromagnetic radiation) using camera module 322 or an input device 318. For example, feature recognition module 320 may detect the intensity, wavelength, pattern, color, or duration of received electromagnetic radiation (e.g., a received frequency-modulated or intensity-modulated light source) received by input device 318. Controller 302 may store feature information in memory unit 314. Input device 318 may be used to read, receive, sense, scan, or otherwise acquire a feature and may include a sensor (e.g., an electromagnetic radiation sensor, such as an optical sensor), scanner (e.g., barcode scanner), RFID reader, magnetic strip reader, keyboard, mouse, or any other type of input device that may be used to read, scan, acquire, or otherwise process a machine-readable feature. A display device 316 may include a Liquid Crystal Display (LCD), CRT display, or plasma display for displaying various information (including, e.g., machine-readable features such as barcodes) and may be controlled by controller 302. Display device 316 may also include one or more LEDs, an LED array, or other electromagnetic radiation output device that may be configured to emit IR, UV, or visible light of a particular pattern, duration, color, wavelength, or intensity. Controller 302 may control the electromagnetic output of display device 316 and may be configured to modulate one or more attributes of the signal (e.g., the signal's pattern, duration, color, wavelength, or intensity).

Device 300 may also include one or more wireless interfaces. In the example of FIG. 3, device 300 includes a Bluetooth interface 304, an RF interface 306, and a Wi-Fi interface 308, but more or fewer types of wireless interfaces may be included in device 300 in other embodiments. RF interface 306 may include an RF transceiver to perform wireless communication with a base station and amplify and filter transmitted and received signals to allow an RF signal to be exchanged between controller 302 and the base station.

Bluetooth interface 304 may perform wireless communications with other Bluetooth devices and allows an RF signal to be exchanged between controller 302 and other Bluetooth devices. In particular, Bluetooth interface 304 may broadcast a request message for a connection with one or more Bluetooth devices relating to the connection parameters accessed from optically acquired machine-readable features. Wi-Fi interface 308 may perform wireless communications with other Wi-Fi devices and allow connection parameters to be exchanged between controller 302 and other Wi-Fi (e.g., 802.11) devices.

An audio processor 310, which may include or be connected to one or more of an acoustic coupler, a digital signal processor, and memory, may be configured to output audio signals using speakers 312 and to receive audio signals using a microphone 311. Audio processor 310 may encode an audio signal into a sequence of modulated tones (e.g., using audio frequency-shift keying (AFSK), dual-tone multi-frequency (DTMF) signaling, or some other suitable audio modulation technique). When received by another device, the modulated tones may be decoded and converted into wireless connection parameters (e.g., a Bluetooth address), as described in more detail below. In some embodiments, the modulated tones may include tones of a frequency outside the human hearing range of approximately 20 Hz to 20 kHz. Additionally or alternatively, the modulated tones may be decoded and converted into a unique identifier that is used, for example, as a key for a table in a relational database. The key may be used to lookup wireless connection parameters from the database. In this way, an audio signal may be used to facilitate device connection or device pairing.

In a typical usage scenario, a user of device 300 may activate input device 318, camera module 322, or microphone 311 to acquire a machine-readable feature. For example, a barcode, watermark, image, symbol, or hologram may be optically acquired by a digital camera associated with device 300. As another example, microphone 311 may be used to receive audio signals. In response to acquiring the machine-readable feature, device 300 may execute an automatic connection or pairing procedure with one or more other devices associated with connection parameters accessed via the machine-readable feature. For example, at least some of the connection parameters may be actually encoded and stored in the machine-readable feature. To access the connection parameters, the encoded machine-feature feature may be decoded and converted into a digital representation of the feature. Additionally or alternatively, at least some of the connection parameters may be accessed from a storage device using the machine-readable feature. For example, the machine-readable feature may be decoded and converted into a digital representation. At least part of this digital representation may then be used as, or contain, a key in a table in a relational database that stores the connection parameters. Another part of the digital representation may be used as, or contain, a network address or URL associated with the database (e.g., a URL or network address used to access the database). The relational database may be stored locally on device 300 or on a network storage device. As yet another example, the machine-readable feature may be decoded to a network address or URL of a storage device (e.g., a network storage device) that stores the connection parameters.

Figure 4A:
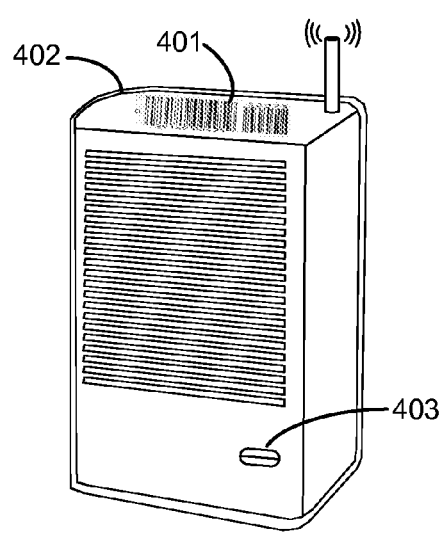
FIGS. 4A, 4B, and 4C are illustrative machine-readable features according to various embodiments of the present invention.
Figure 4B:
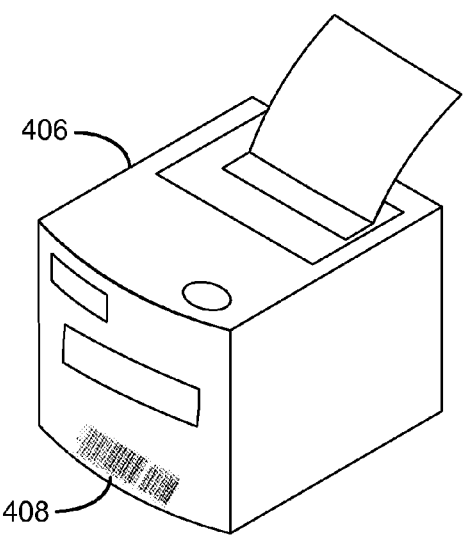
Figure 4C:
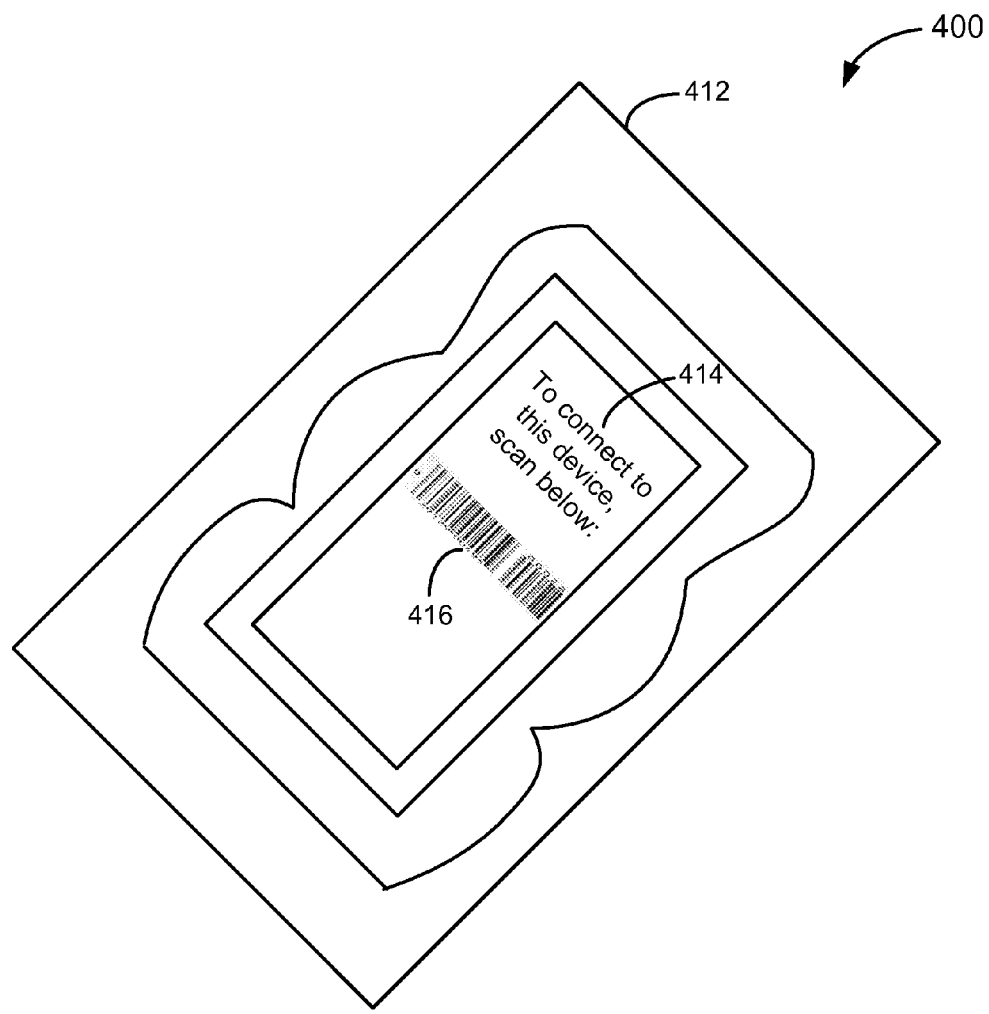

FIGS. 4A, 4B, and 4C show some illustrative devices and the device's associated machine-readable features. FIG. 4A shows a wireless speaker system 402 with a machine-readable feature 404. In the example of FIG. 4A, machine-readable feature 404 may take the form of a linear barcode; however, any other machine-readable feature (e.g., magnetic strip, RFID tag, matrix barcode, or encoded image) may be associated with wireless speaker system 402 in other embodiments. A device that wishes to connect to or pair with wireless speaker system 402 may scan, optically acquire, or read machine-readable feature 404 using a camera, barcode scanner, or magnetic strip reader integrated with or attached to the device. Because wireless speaker system 402 includes audio support, in some embodiments, button 403 of wireless speaker system 402 may be used to initiate an automatic pairing process using audio signals. For example, when a user presses a button 403 of wireless speaker system 402, it may cause an audio controller within wireless speaker system 402 to produce a series of modulated tones (e.g., using audio frequency-shift keying (AFSK), dual-tone multi-frequency (DTMF) signaling, or some other suitable audio modulation technique). The modulated tones, when received by a microphone or sound recording device of a device (e.g., microphone 311 of device 300 (FIG. 3)), may be converted into a spectrogram and a time-frequency analysis may be performed on the spectrogram. The spectrogram may be used as a fingerprint for a unique key that is used to lookup connection parameters (e.g., Bluetooth address and security parameters) in a database. Alternatively, the time-frequency analysis may be used to derive connection parameters directly from the spectrogram. For example, in one embodiment, an audio converter is used to convert aspects of the received audio signals (e.g., frequencies of peak intensity) into raw PCM data which is then converted into binary data. This digital representation of the audio signal may include at least some of the connection parameters used to automatically connect to one or more other devices.

FIG. 4B shows a wireless printer 406 with a machine-readable feature 408. In the example of FIG. 4B, machine-readable feature 408 may take the form of a linear barcode; however, any other machine-readable feature (e.g., magnetic strip, RFID tag, matrix barcode, or encoded image) may be associated with wireless printer 406 in other embodiments. A device that wishes to connect to or pair with wireless printer 406 may scan, optically acquire, or read machine-readable feature 408 using a camera, barcode scanner, or magnetic strip reader integrated with or attached to the device.

In some embodiments, the machine-readable feature (such as machine-readable feature 408) may be incorporated into a label or tag associated with a device (such as wireless printer 406). The machine-readable feature may not be visible to the human eye in some embodiments. For example, a watermark or hidden embedded feature (such as a hidden digital image) may be incorporated into a device logo or brand name printed on the device. Although the watermark or hidden embedded feature may not be visible to a user, after captured using a camera, scanner, or other input device, the watermark or hidden embedded feature may be isolated and decoded to produce or access connection parameters, as described in more detail below.

FIG. 4C shows a device 410 with an integrated display 412. Integrated display 412 may include any type of display, including CRT, LCD, or plasma display. Integrated display 412 may be part of a larger device, such a mobile telephone, laptop computer, printer, scanner, or any other electronic device with wireless network functionality. A processor within device 410 may cause integrated display 412 to display a machine-readable feature 416, which in the example of FIG. 4C takes the form of a linear barcode. Machine-readable feature 416 may be static, dynamic (e.g., change over time), and may be configured by a user of device 410. For example, as discussed in more detail below, some machine-readable features are used to access system clock and synchronization information. This synchronization information may help speed up the connection setup process because a known-valid estimate of the system clock, the clock's phase, and other synchronization information may be included in machine-readable feature 416. In this way, some messages (or exchanges of messages) may be bypassed saving valuable connection and setup time. In some embodiments, machine-readable feature 416 may be updated (e.g., re-encoded and displayed) continuously to reflect changes in system clock and synchronization information. If device 410 is to be used as the master device in a master-slave protocol that adopts the master's clock as the system clock, then machine-readable feature 416 may include an indication of device's 410 own clock (as well as related phase offset information). Other information included in machine-readable feature 416 which may change over time includes encryption keys, PIN values, usage requirements, power requirements, current battery levels, device addresses, and other suitable user settings and options. A label 414 may provide useful instructional messages to the user on how to use machine-readable feature 416.

Figure 5:
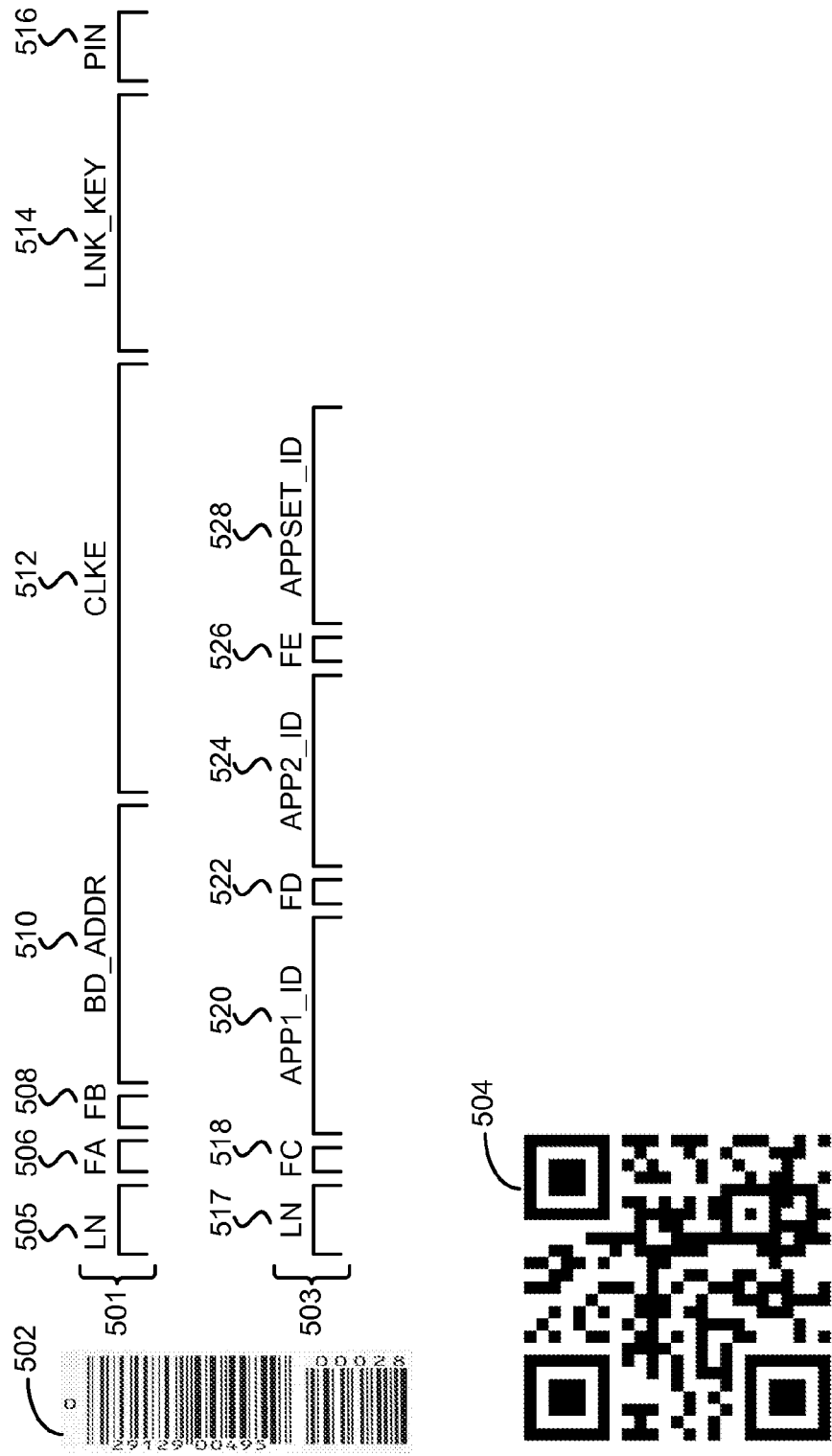
FIG. 5 is an illustrative connection parameter format according to one embodiment of the present invention.

FIG. 5 shows illustrative connection parameter formats according to one embodiment of the present invention. As described above, machine-readable features used for device connection or device pairing may take the form of many different indicia and features. For example, a linear barcode 502, a QR code 504, or both, may both be used to facilitate device connection or device pairing in accordance with the present invention. Other types of machine-readable features may include, for example, characters, symbols, labels, pictorial icons, graphics, images, watermarks, holograms, or any other printed or displayed indicia that may be used to encode, represent, or lookup information. Machine-readable features may also include non-printed features, such as magnetic strips, audio signals, radio frequency identification (RFID) tags, and various other types of sensors and tags embedded or attached to electronic devices and audio signals.

When a device acquires or reads a machine-readable feature, such as linear barcode 502 or QR code 504, the feature may be decoded into a binary string of a particular format or formats. For example, format 501 and 503 may be used to support an automatic device connection or pairing process. Format 501 may include at least a length field 505, a mode flag 506, a security flag 508, an address field 510, a clock field 512, a link key field 514, and a PIN field 516. Length field 505 may include an indication of the length of format 501. Mode flag 506 may indicate whether or not negotiated protocols should be used (for example, if more than one protocol (e.g., Wi-Fi and Bluetooth) is supported). Security flag 508 may indicate whether or not a security mode is required for the connection. Address field 510 may include a network address (e.g., Bluetooth address) of the device. Address field 510 may include a prefix to indicate what type of address (e.g., corresponding to which protocol or standard) is included in address field 510. For example, various network addresses (e.g., MAC addresses, BSSIDs, Bluetooth addresses, IP addresses, etc.) may be supported. The prefix may be used to help identify the type of address as well as protocols or standards supported by the device. Clock field 512 may include various synchronization information (e.g., the device's real-time clock, an estimate of the system clock, or a phase offset). Link key field 514 may include one or more encryption keys (e.g., link keys, session keys, or authentication keys), signed certificates, or other security information. Finally, PIN field 516 may include the PIN or access code associated with the connection.

Format 501 may be used to initiate a connection to one or more devices identified in address field 510. In some embodiments, more than one address field (as well as other related fields) may be included in format 501 to support connections to more than one device. For example, a laptop computer may access a single machine-readable feature to connect to a plurality of devices and peripherals. In this way, any generic device that has not connected to that plurality of devices and peripherals previously may easily initiate automatic connections with the plurality of devices and peripherals using a single read of a machine-readable feature.

As described above, in some embodiments, machine-readable features may also be used to determine the applications supported or required by a device (or by a connection with the device). Format 503 may be used to indicate such applications and may include a length field 517, type fields 518, 522, and 526, and application identifier fields 520, 524, and 528. For example, some piece of software or code may be necessary to enable or configure communication with the device. This software or code may include, for example, a device driver, an operating system update, a communication utility, an antivirus program, or any other application that may be required to connect to the device. Some of the applications identified in format 503 may be actually required to interface with the device or some service running on the device. Other applications may be mandated by a policy (e.g., a security policy) in force on the device. Length field 517 may include an indication of the length of format 503.

Type fields 518, 522, and 526 may be used to determine whether the application is supported or required. Supported applications may be used to indicate what applications and services are available on the device. Required applications may include a basic set of applications necessary for successful interaction with the device. Before a first device is permitted to connect to another device, a determination may be made by other device that the first device has all required applications installed and that these applications are currently running. If a device attempts to connect without a required application or applications installed, the connection attempt may be automatically terminated and an error reported.

In addition, the type field may be used to indicated whether or not an application should be automatically accessed, downloaded, or transferred ("auto-dl" type) to the device on or after requesting a connection. For example, a device driver (or other piece of software) necessary for communication with the device may be automatically downloaded to the connecting device. In such cases, the application identifier field may include a URL or link to the driver or other piece of software. After decoding the machine-readable feature, a device may automatically download applications marked with the "auto-dl" type if the device does not already have the applications installed. Application identifier fields 520, 524, and 528 may each include a unique application identifier or signature used to identify the application. Although only three applications are identified in the example of FIG. 5, more or fewer applications may be included in format 503 in other embodiments.

Figure 6:
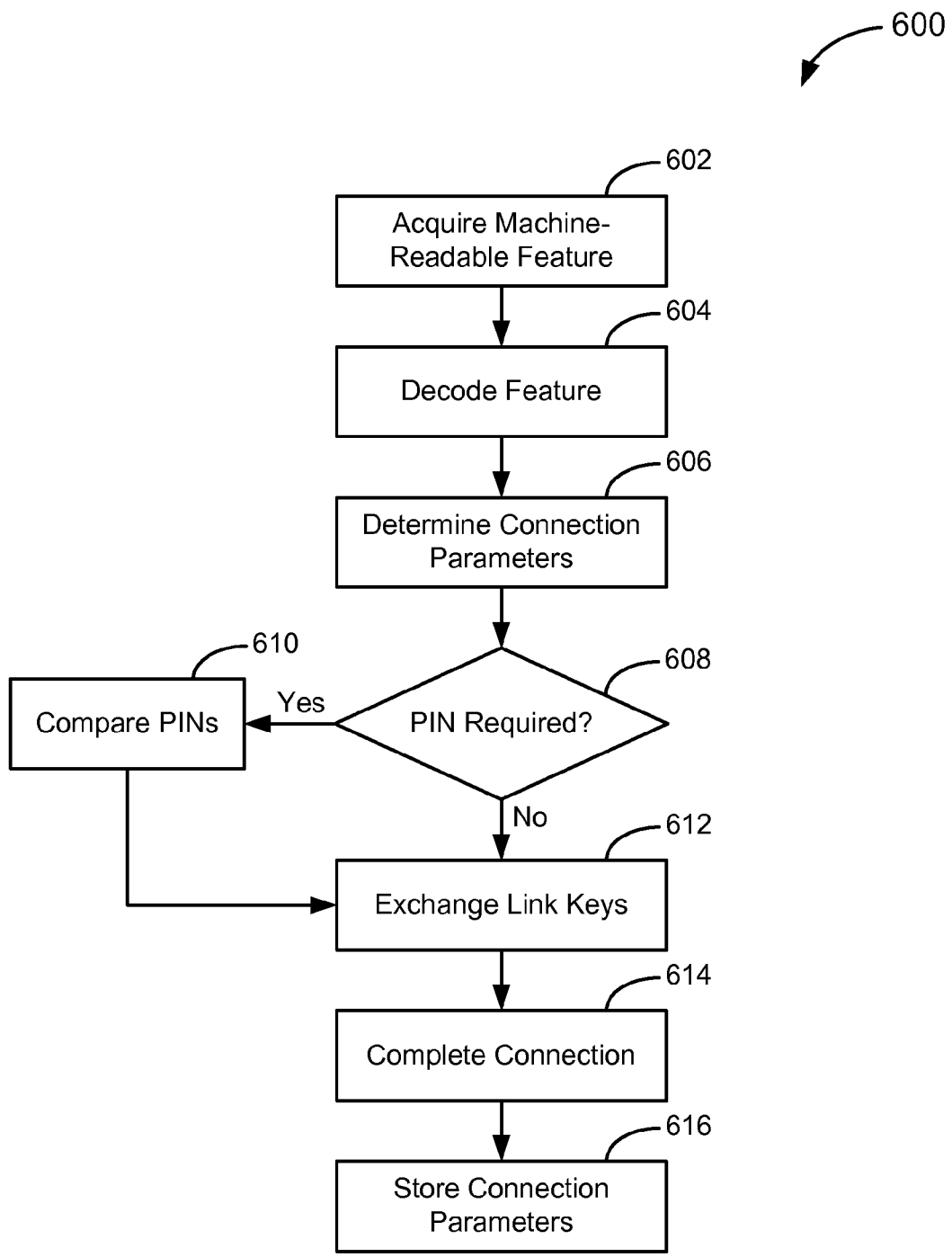
FIGS. 6, 7, and 8 are illustrative processes for supporting automatic device connection or device pairing according to various embodiments of the present invention.
Figure 7:
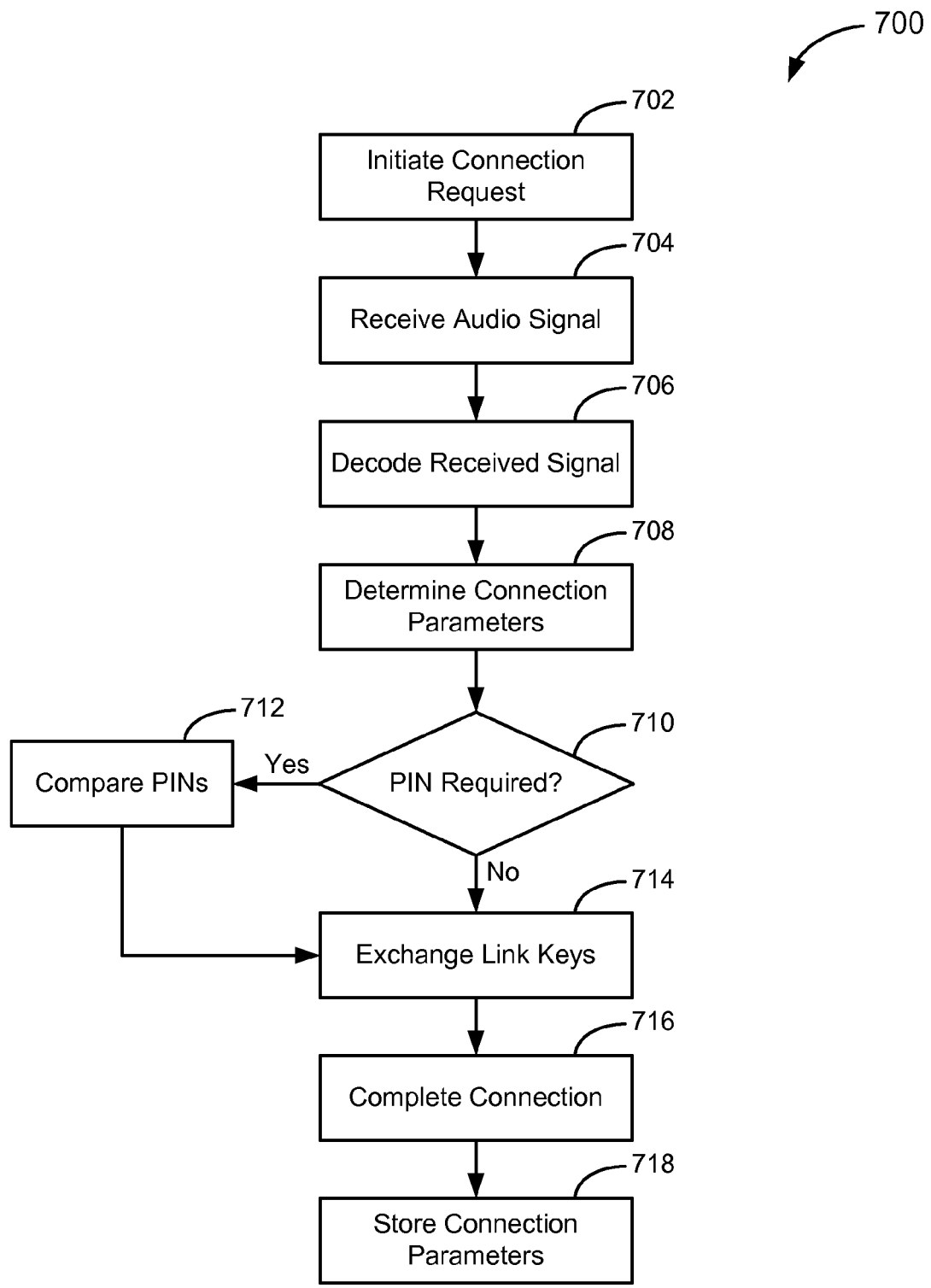
Figure 8:
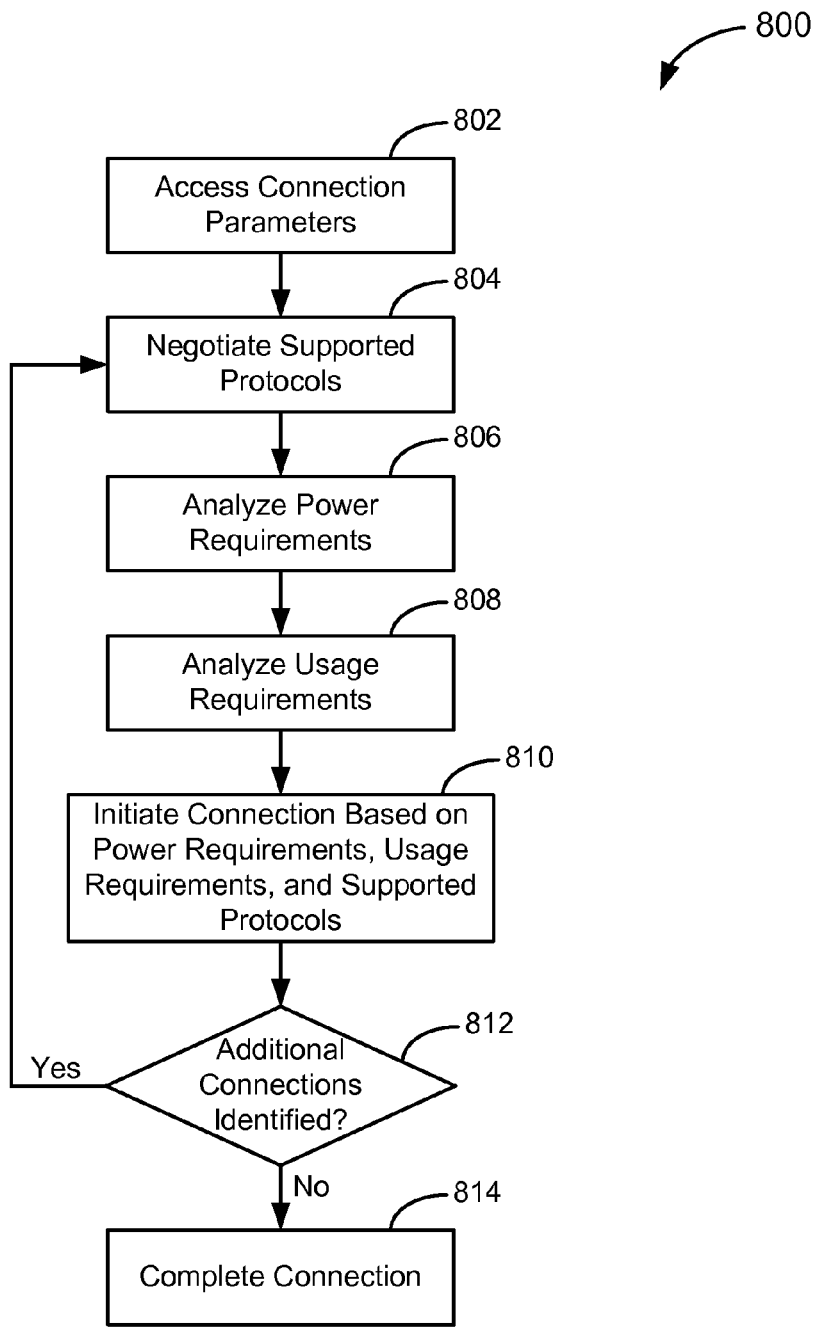

FIGS. 6, 7, and 8 show illustrative processes for supporting the facilitated device connection or device pairing of the present invention. FIG. 6 shows an illustrative process 600 for automatically connecting to an AP or device using a machine-readable feature according to one embodiment of the present invention. At step 602, the machine-readable feature is acquired by a device. For example, camera module 322 (FIG. 3) or input device 318 (FIG. 3) may be used to acquire an image. As another example, a barcode, magnetic strip, or RFID tag may be read at step 602. In some embodiments, an application or computer program running a user's device instructs the user to point to a camera or other input device of the user's device at another device to which the user wishes to connect. The application or program then scans a surface or packaging of the device to which the user wishes to connect and locates the machine-readable feature in order to acquire the feature. After the machine-readable feature is acquired at step 602, one or more of the remaining steps of process 600 may be executed or completed automatically without any intervention from a user. At step 604, the feature may be decoded. Controller 302 (FIG. 3) may decode the encoded machine-readable feature into its raw data (e.g., binary) form. For example, the machine-readable feature may be a barcode and the raw form may included one or more of formats 501 and 503 (both of FIG. 5).

In some embodiments, the machine-readable feature may include a watermark or hidden embedded feature (such as a hidden digital image). This watermark or hidden embedded feature may not be visible or noticeable to the human eye, but it is after acquired using a digital camera, scanner, or other input device it may be isolated and decoded into connection parameters, a unique key used to lookup connection parameters, or both. Various image processing algorithms and techniques may be used to decode the machine-readable feature, including pattern reorganization, character recognition, feature extraction, and dimension reduction.

At step 605, a determination is made whether a PIN (or other access code) is required for the connection. For example, for the Bluetooth protocol, three security modes are defined in the Bluetooth Generic Access Profile (GAP). Security mode 1 is a non-secure mode in which a Bluetooth device does not initiate any security procedures. In security mode 1, both authentication and encryption may be bypassed. Security mode 2 is a service-level enforced security mode in which access to services and devices are controlled. Various security policies and trust levels are defined for simultaneously running applications and services having varying security requirements to permit access to an authorized part of the entire set of device services. Security mode 3 is a link-level enforced security mode in which authentication and encryption are provided based on link keys shared between Bluetooth devices. An essential difference between security mode 2 and security mode 3 is that in security mode 2 the Bluetooth devices initiate security procedures after the channel is established (at the higher layers), while in security mode 3 the Bluetooth devices initiate security procedures before the channel is established (at the lower layers). Two possibilities exist for a device's access to services depending on the devices trust status. A "trusted" device has unrestricted access to all services. An "untrusted" device doesn't have fixed relationships and its access to services is limited. For services, three security levels are defined: services that require authorization and authentication, services that require authentication only, and services that are open to all devices.

In the Bluetooth pairing procedure, for example, a master device may ask for PIN input from a user of the master device. After a connection is attempted after input of the PIN code, a user of a slave device may also be prompted to input a PIN. If the user of the slave device inputs a PIN code that is the same as that input by the user of the master device, the master device and the slave device may exchange link keys assigned according to the input PIN codes, Bluetooth device addresses (BD_ADDR), and random numbers (RAND). The link keys are provided to the master device and slave device to be used in authentication between the master and slave device.

After a new connection between Bluetooth devices is established, a common link key assigned according to a PIN code may be used between the Bluetooth devices for authentication. If an available common link key does not already exist on the Bluetooth devices, a link manager may automatically perform an initialization procedure to exchange link keys. If a determination is made by the master device or the slave device that a PIN is required for the connection, then at step 610 the master device or the slave device may compare the PIN of the other device to its own PIN. After a successful comparison at step 610, or if PIN values are not required to be exchanged, at step 612 link keys may be exchanged between the master device and the slave device. As discussed above, link keys are provided to the master device and the slave device to be used in authentication between the master device and the slave device. At step 614, the connection between the master device and the slave device may be completed and maintained until released by a user at the master device or a user at the slave device. At step 616, one or more connection parameters (e.g., one or more of the parameters defined in formats 501 and 503 (both of FIG. 5)) may then be stored to the master device, the slave device, or both devices. For example, these connection parameters may be used in subsequent connections by the same devices in order to reduce setup and connection time.

In practice, one or more steps shown in process 600 may be combined with other steps, performed in any suitable order, performed in parallel (e.g., simultaneously or substantially simultaneously), or removed.

FIG. 7 shows illustrative process 700 for processing an audio signal used to facilitate connection or pairing between devices according to one embodiment of the present invention. At step 700, a user may initiate a connection request. For example, a user may press button 403 (FIG. 4) of a wireless speaker or audio system. Initiating a connection request may cause an audio controller within a wireless audio system to produce a series of modulated tones (e.g., using audio frequency-shift keying (AFSK), dual-tone multi-frequency (DTMF) signaling, or some other suitable audio modulation technique). In some embodiments, the modulated tones may include tones of a frequency outside the human hearing range of approximately 20 Hz to 20 kHz. The modulated tones are received by a device at step 704 by, for example, a microphone of the device (e.g., microphone 311 of FIG. 3). After the audio signal is received at step 704, one or more of the remaining steps of process 700 may be executed or completed automatically without any intervention from a user. For example, the received audio signal may be decoded and analyzed automatically in response to receiving the audio signal at step 706. In some embodiments, the audio signal may be converted into a spectrogram and a time-frequency analysis may be performed on the spectrogram. Other suitable audio processing, such as filtering, equalization, echo-cancellation, and reverberation-cancellation, may also be performed at step 706. At step 706, a digital representation of the received audio signal may be created and stored. The digital representation may express the pressure wave-form as a sequence of symbols, for example, binary numbers. This digital representation may then be processed using digital circuits, such as audio processor 310 (FIG. 3), controller 302 (FIG. 3), and digital signal processors.

At step 708, connection parameters are determined from the digital representation of the received audio signal. For example, the digital representation may take the form or one or more of formats 501 and 503 (both of FIG. 5). Connection parameters may include one or more addresses (e.g., Bluetooth addresses, MAC addresses, IP addresses, BSSIDs, etc.), one or more clock estimates, other synchronization information, and security information (e.g., various link keys, signed certificates, PIN values, etc.) used in the connection process. At step 710, a determination is made whether a PIN (or other access code) is required for the connection. If a determination is made that a PIN is required for the connection, then at step 712 a comparison of the slave device's PIN and the master device's PIN may be made. After a successful comparison at step 712, or if PIN values are not required to be exchanged, at step 714 link keys may be exchanged. As discussed above, link keys are provided to the master device and the slave device to be used in authentication between the master device and the slave device. At step 716, the connection may be completed and maintained until released by a user at the master device or a user at the slave device. At step 718, one or more connection parameters (e.g., one or more of the parameters defined in formats 501 and 503 (both of FIG. 5)) may then be stored to the master device, the slave device, or both devices. For example, these connection parameters may be used in subsequent connections by the same devices in order to reduce setup and connection time.

In practice, one or more steps shown in process 700 may be combined with other steps, performed in any suitable order, performed in parallel (e.g., simultaneously or substantially simultaneously), or removed.

FIG. 8 shows illustrative process 800 for negotiating connection protocols according to one embodiment of the present invention. As described above, often times two or more devices may support more than one wireless standard or protocol. For example, two devices may support connections using more than one of 802.11, Bluetooth, IrDA, UWB, Z-Wave®, ZigBee®, ANT™, and Bluetooth Low Energy (also known as Bluetooth 4.0). Each of these connection types may be associated with a transmit power specification (e.g., a minimum transmit power) and range. Using a protocol with a higher than needed transmit power may reduce battery life for a mobile device. Using a protocol with a longer than needed range may increase interference with other devices using the same or different protocol. As such, in some embodiments, when facilitated (e.g., automatic) wireless connections are desired, a protocol negotiation technique may be used to increase battery life of one or more of the devices, to decrease interference with neighboring wireless networks, or both.

Depending on the anticipated mobility of the devices, the anticipated applications to be used on the devices, and a power requirements analysis, the most appropriate protocol may be negotiated automatically. In some embodiments, the protocol with the lowest transmit power or range is selected for use unless that protocol is not suitable for the anticipated usage of the devices. In some embodiments, the protocol with the strongest security policy (e.g., encryption or authentication) is selected for use unless that protocol is not suitable for the anticipated usage of the devices. In some embodiments, the protocol with the lowest transmit power or range and the strongest security policy (e.g., encryption or authentication) is selected for use unless that protocol is not suitable for the anticipated usage of the devices.

At step 802, connection parameters may be accessed. For example, a machine-readable feature may be acquired as described in process 600 (FIG. 6) or an audio signal may be received as described in process 700 (FIG. 7). At step 804, supported protocols may be negotiated between the devices wishing to connect. For example, a supported protocol "query" packet may be exchanged between the devices. Alternatively, supported protocols may be derived directly from the accessed connection parameters. As described above, address field 510 (FIG. 5) may include a network address (e.g., Bluetooth address) of the device. Address field 510 (FIG. 5) may also include a prefix to indicate what type of address (e.g., corresponding to which protocol or standard) is included in the address field. In some embodiments, this address prefix is used to determine which protocols or standards are supported by the device. In some embodiments, a user may specify the supported protocols via a user interface and input device.

At step 806, the power requirements of the devices may be analyzed. For example, both devices may be on AC power, one device may be on AC power and one device may be on battery power, or both devices may be on battery power. Battery life remaining levels may also be accessed at step 806. For example, a device may send an indication of the device's remaining battery power to another device during the connection process. Alternatively, battery life levels and power requirements may be included in the machine-readable feature, if dynamic machine-readable features are used. In this way, a device may read power requirements of another device directly from a machine-readable feature.

At step 808, anticipated usage requirements may be analyzed. For example, devices may require only intermittent communication with certain devices (e.g., some peripherals such as printers) or more constant communication (e.g., some peripherals such as input devices such as mice and keyboards, and APs). Usage requirements may also include anticipated usage range. For example, PANs including Bluetooth devices are associated with a more limited range than WLAN devices, such as 802.11 devices. At step 808, an indication of the anticipated range may be communicated from the device initiating the connection to another device to which the connecting device wishes to connect. Depending on the anticipated range, certain protocols may not be suitable for the facilitated connection. At step 810, a connection may be initiated based at least in part on the power requirements analysis, the anticipated usage requirements, and the supported protocols of the devices.

If the anticipated usage requirements (e.g., range) is unsuitable for a PAN connection, then PAN connection types may be eliminated from consideration (or assigned a lower priority). If the analyzed power requirements indicate that one or more devices is on battery power, then higher transmit power protocols may be eliminated from consideration (or assigned a lower priority). If both devices are on battery power, then an even lower priority may be assigned to higher transmit power protocols.

At step 810, the connection type with the highest priority may be attempted first and then all remaining connection types may be attempted in priority order until a valid connection is created. Priorities may be weighted based on user preferences and user-configurable. In this way, the most appropriate protocol given the power requirements of the devices and the anticipated usage requirements of the devices may be selected for a connection.

At step 812, a determination may be made if additional connections are to be initiated. For example, as described above, a device may wish to connect automatically to a plurality of peripherals and other devices by accessing a single machine-readable feature. If additional connections are desired, then process 800 may return to step 804 to negotiate supported protocols with another device. If no additional connections are desired, the connection completes at step 812 and is maintained until the connection is released by one of the connected devices.

In some embodiments, a computer-readable medium containing computer-readable instructions recorded thereon is provided. For example, memory unit 314 (FIG. 3) may store an application or computer program product accessible from a computer-usable or computer-readable medium providing program code for use by or in connection with device 300 (FIG. 3) or any instruction execution system. For the purposes of this description, a computer-usable or computer-readable medium may include any tangible medium or apparatus that can contain, store, communicate, propagate, or transport the program for use by or in connection with the instruction execution system, apparatus, or device.

The medium may be an electronic, magnetic, optical, electromagnetic, infrared, or semiconductor system (or apparatus or device), or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks may include compact disc read-only memory (CD-ROM), a rewritable compact disc (CD-R/W), and digital video disc (DVD).

A data processing system (e.g., including controller 302 (FIG. 3)) is suitable for storing and/or executing program code will include at least one processor coupled directly or indirectly to memory elements through a system bus. The memory elements may include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) may be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the currently available types of network adapters.

While various embodiments have been described above in the context of a master-slave arrangement, any wireless protocol using any wireless communication standard may be supported by the systems and methods described herein. In addition, although Bluetooth devices are specifically used in some of the illustrative examples described herein, any electronic device may be adapted to support the facilitated device connection and pairing techniques disclosed herein. For example, devices may initiate facilitated connections with other devices, peripherals and APs. Furthermore, it is to be understood that the various embodiments described above may be used and adapted for other types of delays not specifically described herein. It is to be understood that the examples and embodiments described above are for illustrative purposes only and that various modifications or changes in light thereof will be suggested to persons skilled in the art, and are to be included within the spirit and purview of this application and scope of the appended claims. Therefore, the above description should not be understood as limiting the scope of the invention as defined by the claims.

What is claimed is:

1. A method for wireless device connection or device pairing comprising:
    acquiring, with a wireless device, a machine-readable feature; and
    in response to acquiring the machine-readable feature:
        decoding the machine-readable feature;
        accessing connection parameters relating to at least one other wireless device based at least in part on the decoded machine-readable feature; and
        initiating a wireless connection between the wireless device and the at least one other wireless device based at least in part on the accessed connection parameters,
    wherein the accessing comprises:
        converting the decoded machine-readable feature into a digital representation;
        using at least a first part of the digital representation as a key for a database table;
        using at least a second part of the digital representation as a network address; and
        looking up, based at least in part on the key and network address, the connection parameters from the database table.

2. The method of claim 1, wherein acquiring the machine-readable feature comprises optically acquiring a printed or displayed machine-readable feature.

3. The method of claim 1, wherein acquiring the machine-readable feature comprises receiving an audio signal comprising a series of modulated tones.

4. The method of claim 3, wherein the modulated tones comprise at least one tone of a frequency outside the human hearing range of approximately 20 Hz to 20 kHz.

5. The method of claim 1, wherein acquiring the machine-readable feature comprises receiving a radio frequency identification (RFID) signal from an RFID tag associated with the at least one other wireless device.

6. The method of claim 1, wherein acquiring the machine-readable feature comprises reading a magnetic code from a magnetic strip associated with the at least one other wireless device.

7. The method of claim 1, wherein acquiring the machine-readable feature comprises detecting electromagnetic radiation in the visible, UV, or IR range.

8. The method of claim 1, wherein the initiating step comprises negotiating authentication or encryption protocols.

9. The method of claim 1, wherein the accessing step further comprises: reading the connection parameters from the digital representation.

10. The method of claim 1, wherein the connection parameters comprise synchronization information.

11. The method of claim 10, wherein the synchronization information comprises a system clock estimate for wireless connection.

12. The method of claim 1, further comprising:
determining power requirements of the wireless device;
determining usage requirements of the wireless device; and
negotiating a protocol to be used for the wireless connection based, at least in part, on at least one of the determined power requirements and the determined usage requirements.

13. The method of claim 12, wherein determining power requirements of the wireless device comprises determining a current battery power level of the wireless device.

14. The method of claim 13, wherein determining the current battery power level of the wireless device comprises reading the current battery power level from the decoded machine-readable feature.

15. The method of claim 12, wherein determining usage requirements of the wireless device comprises determining an anticipated range between the wireless device and the at least one other wireless device.

16. The method of claim 15, wherein determining the anticipated range between the wireless device and the at least one other wireless device comprises reading anticipated range from the decoded machine-readable feature.

17. The method of claim 1, wherein the machine-readable feature is a dynamic machine-readable feature that changes over time, the method further comprising displaying the dynamic machine-readable feature on a display device.

18. The method of claim 1, wherein the initiating step further comprises pairing the wireless device and the at least one other wireless device.

19. The method of claim 1, wherein the connection parameters comprise an application identifier and wherein the initiating step comprises downloading an application identified by the application identifier from a network location, wherein the application enables communication between the wireless device and the at least one other wireless device.

20. The method of claim 1, wherein the connection parameters comprise an application identifier and wherein the initiating step comprises verifying that an application identified by the application identifier is installed on the at least one other wireless device.

21. A system for wireless device connection or device pairing comprising:
a machine-readable feature; and
a wireless device comprising a controller configured to:
    acquire the machine-readable feature,
    in response to acquiring the machine-readable feature:
        decode the machine-readable feature,
        access, using the decoded machine-readable feature, connection parameters relating to at least one other wireless device, and
        establish a wireless connection between the wireless device and the at least one other wireless device,
    wherein the accessing comprises:
        converting the decoded machine-readable feature into a digital representation;
        using at least a first part of the digital representation as a key for a database table;
        using at least a second part of the digital representation as a network address; and
        looking up, based at least in part on the key and network address, the connection parameters from the database table.

22. The system of claim 21, wherein the controller is configured to acquire the machine-readable feature by optically acquiring a printed or displayed machine-readable feature.

23. The system of claim 21, wherein the controller is configured to acquire the machine-readable feature by receiving an audio signal comprising a series of modulated tones.

24. The system of claim 23, wherein the modulated tones comprise at least one tone of a frequency outside the human hearing range of approximately 20 Hz to 20 kHz.

25. The system of claim 21, wherein the controller is configured to acquire the machine-readable feature by receiving a radio frequency identification (RFID) signal from an RFID tag associated with the at least one other wireless device.

26. The system of claim 21, wherein the controller is configured to acquire the machine-readable feature by reading a magnetic code from a magnetic strip associated with the at least one other wireless device.

27. The system of claim 21, wherein the controller is configured to acquire the machine-readable feature by detecting electromagnetic radiation in the visible, UV, or IR range.

28. A non-transitory computer-readable medium comprising computer-readable instructions recorded thereon, that, when executed by a processor, cause the processor to:
acquire, with a wireless device, a machine-readable feature; and
in response to acquiring the machine-readable feature:
    decode the machine-readable feature;
    access, using the decoded machine-readable feature, connection parameters relating to at least one other wireless device, and
    establish a wireless connection between the wireless device and the at least one other wireless device,
wherein the accessing comprises:
    converting the decoded machine-readable feature into a digital representation;
    using at least a first part of the digital representation as a key for a database table;
    using at least a second part of the digital representation as a network address; and
    looking up, based at least in part on the key and network address, the connection parameters from the database table.

* * * * *